US006991471B2

(12) United States Patent
Hayashi et al.

(10) Patent No.: US 6,991,471 B2
(45) Date of Patent: Jan. 31, 2006

(54) PLUG-IN UNIT, A HOUSING AND AN ELECTRONIC APPARATUS

(75) Inventors: Mitsuaki Hayashi, Yokohama (JP); Akira Sawada, Yokohama (JP); Kouichi Kuramitsu, Yokohama (JP); Wataru Takano, Yokohama (JP); Minoru Fujii, Yokohama (JP); Hironori Tanaka, Yokohama (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/788,915

(22) Filed: Feb. 27, 2004

(65) Prior Publication Data

US 2005/0074222 A1 Apr. 7, 2005

(30) Foreign Application Priority Data

Oct. 7, 2003 (JP) ............................. 2003-348482

(51) Int. Cl.
*H01R 12/00* (2006.01)
*H05K 1/00* (2006.01)

(52) U.S. Cl. ........................................................ 439/61

(58) Field of Classification Search .................. 439/61, 439/157; 385/88–89, 53, 136–137
See application file for complete search history.

(56) References Cited

U.S. PATENT DOCUMENTS 6,644,866 B1 * 11/2003 Kusuda et al. ................ 385/88

FOREIGN PATENT DOCUMENTS

JP 6-151972 1/1996
JP 2000-147269 5/2000

* cited by examiner

*Primary Examiner*—Javaid H. Nasri
(74) *Attorney, Agent, or Firm*—Katten Muchin Rosenman LLP

(57) ABSTRACT

An electronic apparatus has a plug-in unit and a housing that can increase a number of optical modules connected thereto. In the plug-in unit, a first connector is connectable to an optical module connected to an optical cable. A connector housing accommodates the first connector and has an insertion part into which the optical module is inserted. An attachment lever is used for fixing the plug-in unit to the housing in which the plug-in unit is accommodated. The first connector is located on a back side of the plug-in unit opposite to a front side where the attachment lever is located.

8 Claims, 14 Drawing Sheets

PLUG-IN UNIT SIDE

PLUG-IN UNIT SIDE

PLUG-IN UNIT, A HOUSING AND AN ELECTRONIC APPARATUS

BACKGROUND OF THE INVENTION

1. Field of the Invention

The present invention generally relates to electronic apparatuses and, more particularly, to a plug-in unit and a housing of an electronic apparatus, which performs information processing or communication using optical modules.

2. Description of the Related Art

Among electronic apparatuses of optical communication systems that multiplex optical signals, there is one in which an optical cable is connected to a plurality of printed wiring board through optical connectors so as to perform information processing or optical communication (for example, refer to Japanese Laid-Open Patent Application No. 2000-147269).

There is a demand for such an electronic apparatus to increase a capacity of a trunk network due to an increase in an amount of information to be transmitted and an increase in a demand of data transmission in association with popularization of the Internet. In order to satisfy such a demand, an increase in an information transmission capacity and an improvement of functions are required for such an electronic apparatus. However, the optical connector mentioned above cannot handle a wide variety of signals, and, thus, an electronic apparatus using optical modules is used.

Recently, an SFP module, which is one of optical modules, has become popular, and an attachment case and a connector for attaching the SFP module are mounted to many plug-in units. Thus, in many cases, the SFP module is mounted to the plug-in unit with an optical cable connected to the attachment case. Such an SFP module is configured and arranged to permit an addition of modules or a replacement with other modules.

Such an electronic apparatus is connected with circuits corresponding to necessary number of lines initially so as to minimize an initial installation cost required for the electronic apparatus. Then, an addition or replacement of optical modules or electric modules may be performed if necessary.

FIG. 1 is a perspective view of a conventional electronic apparatus. FIG. 2 is a plan view of a plug-in unit to which a back board is attached. FIG. 3 is a plan view of the electronic apparatus accommodate in a locker. It should be noted that "front side" shown in FIGS. 1 through 3 indicates a side of the electronic apparatus 10 where attachment levers 14 are provided, and "apparatus back side" indicates a side of the electronic apparatus 10 opposite to the side where the attachment levers 14 are provided.

As shown in FIG. 1 through 3, the electronic apparatus 10 generally comprises a housing 11, a plurality of plug-in units 12 and a back board 25. As shown in FIG. 1, an opening is formed in the housing 11 on the front side so that the plug-in units 12 are inserted and into the housing 11 through the opening and are accommodated in the housing 11.

The plug-in unit 12 comprises a printed wiring board 13, the attachment levers 14, attachment cases 15, electronic parts 16, LED parts 17, optical modules 18, plugs 19, optical cables 21 and connectors 23 for electric connection. The electronic parts are mounted on the printed wiring board 13.

The attachment levers 14 for attaching the plug-in unit 12, the attachment cases 15 for attaching the optical modules 18 and LED parts 17 for indicating operations are provided on the front side of the printed wiring board 13. Additionally, indication labels are provided in the vicinity of the respective LED parts 17.

A connector 22 to be connected to the optical module 18 is provided in each of the attachment cases 15. As shown in FIG. 2, the optical cables 21 are connected to the printed wiring board 13 by attaching the optical modules 18 to the attachment cases 15. The optical modules 18 are not always connected to all the attachment cases 15, and only a desired number of optical modules 18 are connected to the respective attachment cases 15. Additionally, the optical cables 21 are bundled by holders 24 so that the LED parts 17 and the indication labels can be checked easily. The connectors 23 for electric connections are mounted on the printed wiring board 13 on the back side so as to connect the back board 15 to the printed wiring board 13.

The back board 25 comprises a back board body 26 and plugs 27 mounted on the back board body 26. The back board 25 is electrically connected to the plug-in unit 12 by attaching the plugs 27 to the connectors 23.

The electronic apparatus 10 is accommodated in a locker 29 as shown in FIG. 3, and is supported by support parts **29*a*. An area A is provided between a front face 29A and the electronic apparatus 10 so that the bundled optical cables 21 are accommodated therein. Additionally, reinforcing members 31 are provided to the support parts 29*a* of the locker 29 so as to firmly support the electronic apparatus 10**.

According to the electronic apparatus 10 having the above-mentioned structure, a necessary number of optical modules 18 can be mounted so as to minimize the initial investment to the electronic apparatus 10. Additional optical modules 18 can be attached without removing the plug-in unit 12 while other lines are being in operation. The optical modules 18 can be replaced with other kinds of modules having a different transmissible distance.

However, there is a problem in the conventional electronic apparatus 10 in that a number of optical modules 18 for attaching the optical modules 18 is limited due to a limited area where the attachment cases 15 are provided since the attachment cases 15 are mounted to the printed wiring board 13 on the front side where the LED parts 17 and the indication labels are provided.

Additionally, there is a problem in that the optical cables are obstructive when inserting or removing the plug-in unit 12 since the optical modules connected to the optical cables 21 are attached to the attachment cases 15 provided on the front side of the apparatus. Further, there is a problem that it is difficult to visually recognize the LED parts 17 and the indication labels since the optical cables form an obstacle. Furthermore, the optical cables 21 connected to the plug-in unit 12, which is to be removed from the housing 11 for maintenance check, must be removed from the plug-in unit 21 concerned, which deteriorates maintainability.

Additionally, there is a problem in that the reinforcing members 31 must be provided to the support parts **29*a* of the locker 29 since the area A, where the bundled optical cables 21 are accommodated when the electronic apparatus 10 is accommodated in the locker 29, must be provided on the side of the front face 29A of the locker 29**.

SUMMARY OF THE INVENTION

It is a general object of the present invention to provide an improved and useful electronic apparatus having a plug-in unit and a housing, in which the above-mentioned problems are eliminated.

A more specific object of the present invention is to provide an electronic apparatus having a plug-in unit and a housing that can easily increase a number of optical modules connected thereto.

Another object of the present invention is to provide an electronic apparatus having a plug-in unit and a housing that can provide easy visual recognition of LED parts and indication labels.

A further object of the present invention is to provide an electronic apparatus having a plug-in unit and a housing that can improve maintainability thereof.

In order to achieve the above-mentioned objects, there is provided according to the present invention a plug-in unit comprising: a first connector connectable to an optical module connected to an-optical cable; a connector housing accommodating the first connector and having an insertion part into which the optical module is inserted; and an attachment lever that is used for fixing the plug-in unit to a housing in which the plug-in unit is accommodated, wherein the first connector is located on a first side of the plug-in unit opposite to a second side where the attachment lever is located.

According to the above-mentioned invention, a plurality of the connector housings can be provided on the second side, which is a back side of the plug-in unit since no attachment lever is provided on the second side and the there is no part that may be influenced by the optical cable that extends from the optical module. Thus, a more number of the connector housings can be provided to the plug-in unit than a conventional plug-in unit that has the connector housing on the first side, which is a front side of the plug-in unit without deteriorating visibility of LED parts and indication labels that are provided on the front side of the plug-in unit.

In the plug-in unit according to the present invention, an open end of the insertion part may have a chamfer part that guides the optical module moving into the insertion part.

Additionally, there is provided according to another aspect of the present invention a housing configured and arranged to accommodate a plug-in unit, comprising: a back board to which the plug-in unit is attached; and an optical module housing mounted on the back board, the optical module detachably attaches the optical module.

According to the above-mentioned invention, when a maintenance work is performed on the plug-in unit, the plug-in unit can be taken out of the housing without removing the optical cable connected to the optical module, thereby improving maintenanceability.

In the housing according to the present invention, the optical module housing may have an engagement part configured and arranged to be engaged with the optical module so as to hold the optical module in the optical module housing. Accordingly, the plug-in unit can be attached to and detached from the housing while the optical module is maintained to be engaged with the optical module housing.

In the housing according to the present invention, the plug-in unit may comprise: a first connector connectable to an optical module connected to an optical cable; a connector housing accommodating the first connector and having an insertion part into which the optical module is inserted; and an attachment lever that is used for fixing the plug-in unit to the housing, wherein the first connector is located on a first side of the plug-in unit opposite to a second side where the attachment lever is located.

Additionally, there is provided according to another aspect of the present invention an electronic apparatus comprising: a housing including: a back board to which the plug-in unit is attached; and an optical module housing mounted on the back board so as to detachably attach the optical module; and a plug-in unit that is accommodated in the housing, the plug-in unit including: a first connector connectable to an optical module connected to an optical cable; a connector housing accommodating the first connector and having an insertion part into which the optical module is inserted; and an attachment lever that is used for fixing the plug-in unit to the housing, wherein the first connector is located on a first side of the plug-in unit opposite to a second side where the attachment lever is located.

According to the above-mentioned invention, a more number of the connector housings can be provided to the plug-in unit than a conventional plug-in unit without deteriorating visibility of LED parts and indication labels that are provided on the front side of the plug-in unit.

In the electronic apparatus according to the present invention, the optical module housing may include: a first housing provided on a first surface of the back board, the first housing forming a first insertion part that is a part of the insertion part; and a second housing provided on a second surface of the back board opposite to the first surface and forming a second insertion part that is a part of the insertion part, a metal plate being provided in the second insertion part so as to discharge static electricity, wherein the first insertion part and the second insertion part are configured and arranged to receive the optical module.

According to the above-mentioned invention, the optical module can be easily inserted into the first and second insertion parts. Additionally, static electricity formed in the optical module can be discharged through the metal plate, which prevents the plug-in unit form being damaged.

In the electronic apparatus, the metal plate may have a first elastically deformable part configured and arranged to be connected to the second surface of the back board. Additionally, the metal plate may have a second elastically deformable part configured and arranged to support the optical module.

In the electronic apparatus according to the present invention, the first housing may have a pair of mis-insertion preventing members each of which has an end having a chamfer part.

Additionally, in the electronic apparatus according to the present invention, the optical module may have an engagement protrusion, and the optical module housing may have an engagement groove that is engaged with the engagement protrusion when the optical module is attached to the optical module housing.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of an embodiment of the present invention.

Figure 1:
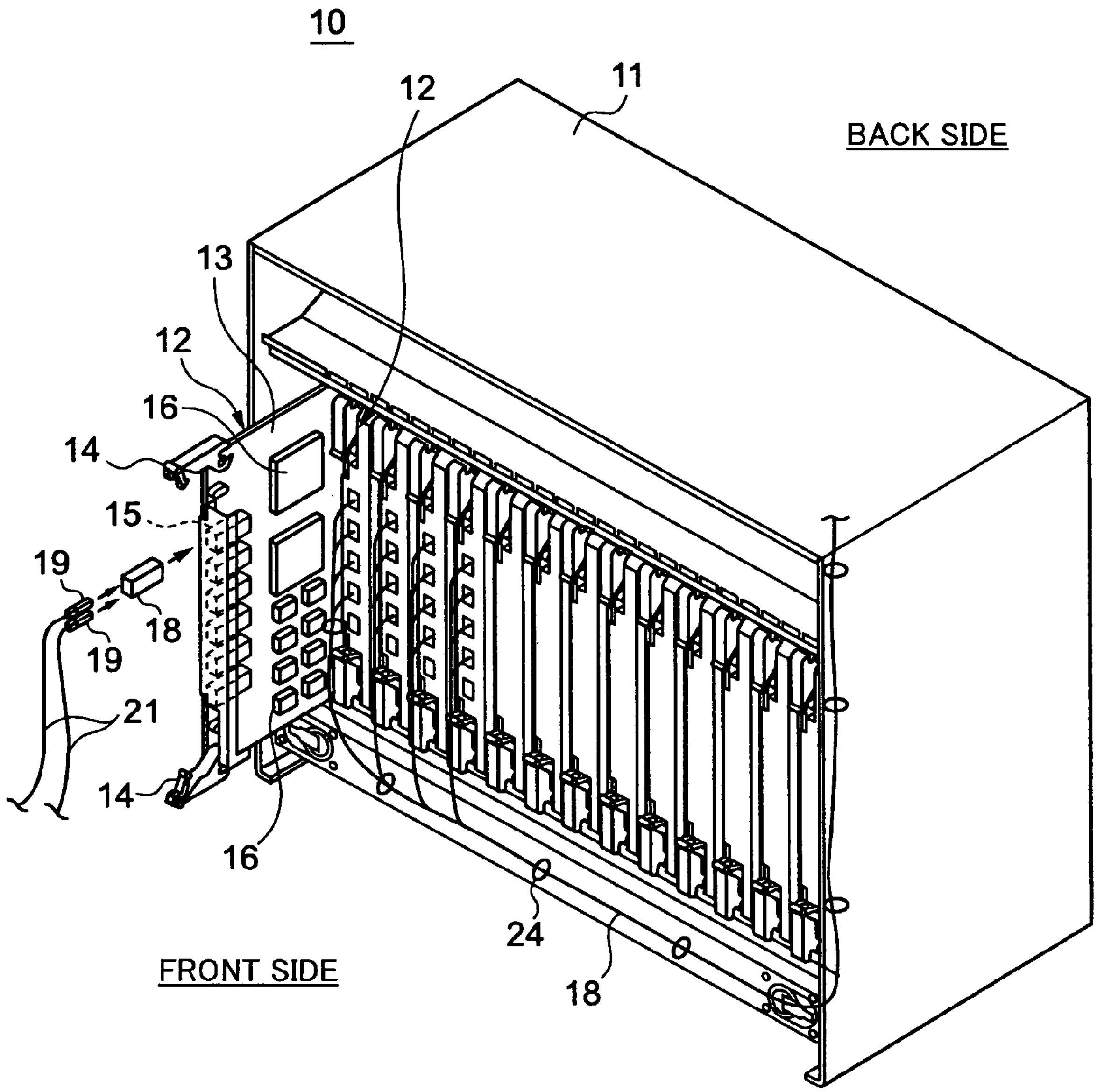
FIG. 1 is a perspective view of a conventional electronic apparatus.
Figure 2:
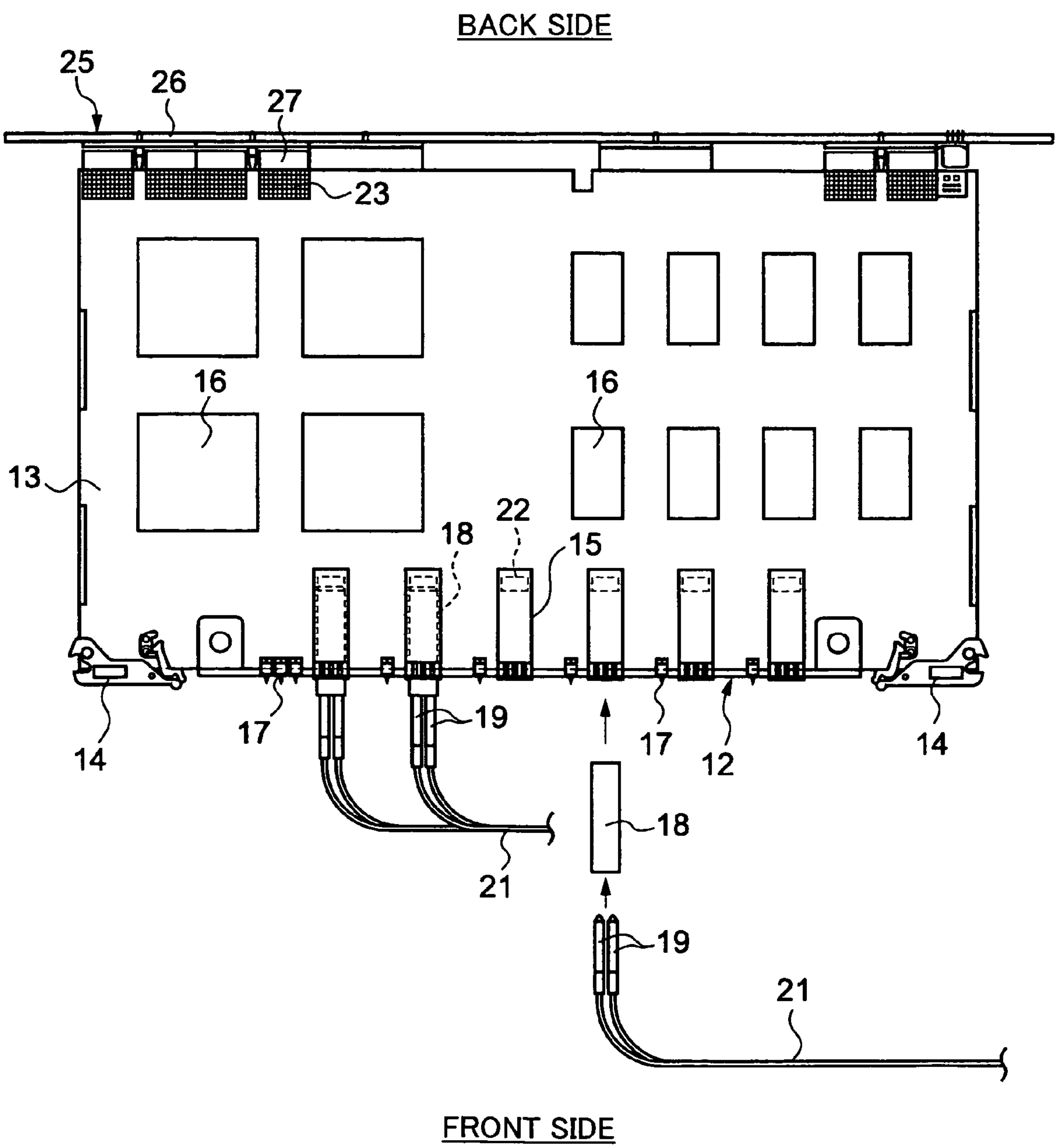
FIG. 2 is a plan view of a plug-in unit to which a back board is attached.
Figure 3:
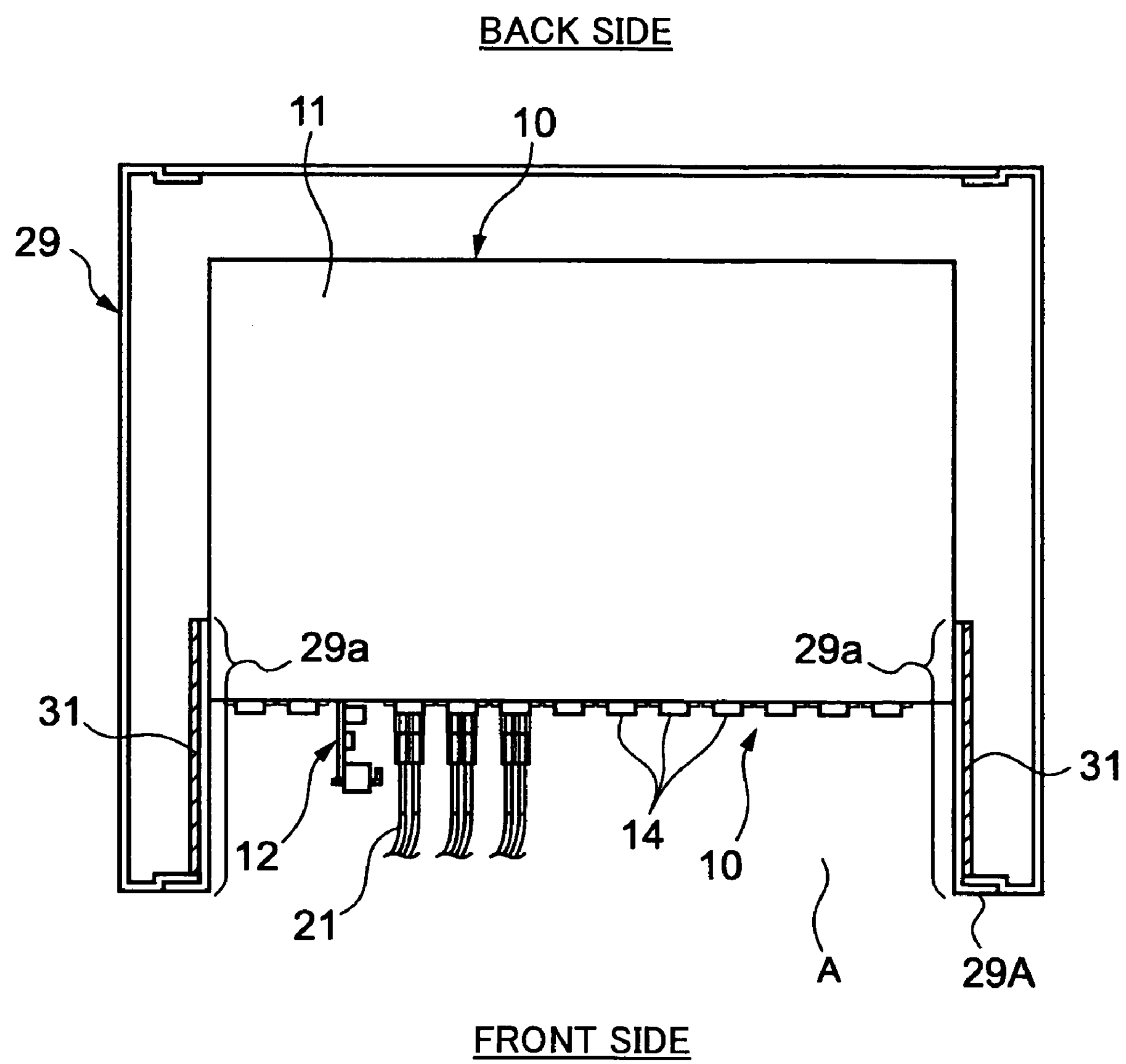
FIG. 3 is a plan view of the electronic apparatus accommodate in a locker.
Figure 4:
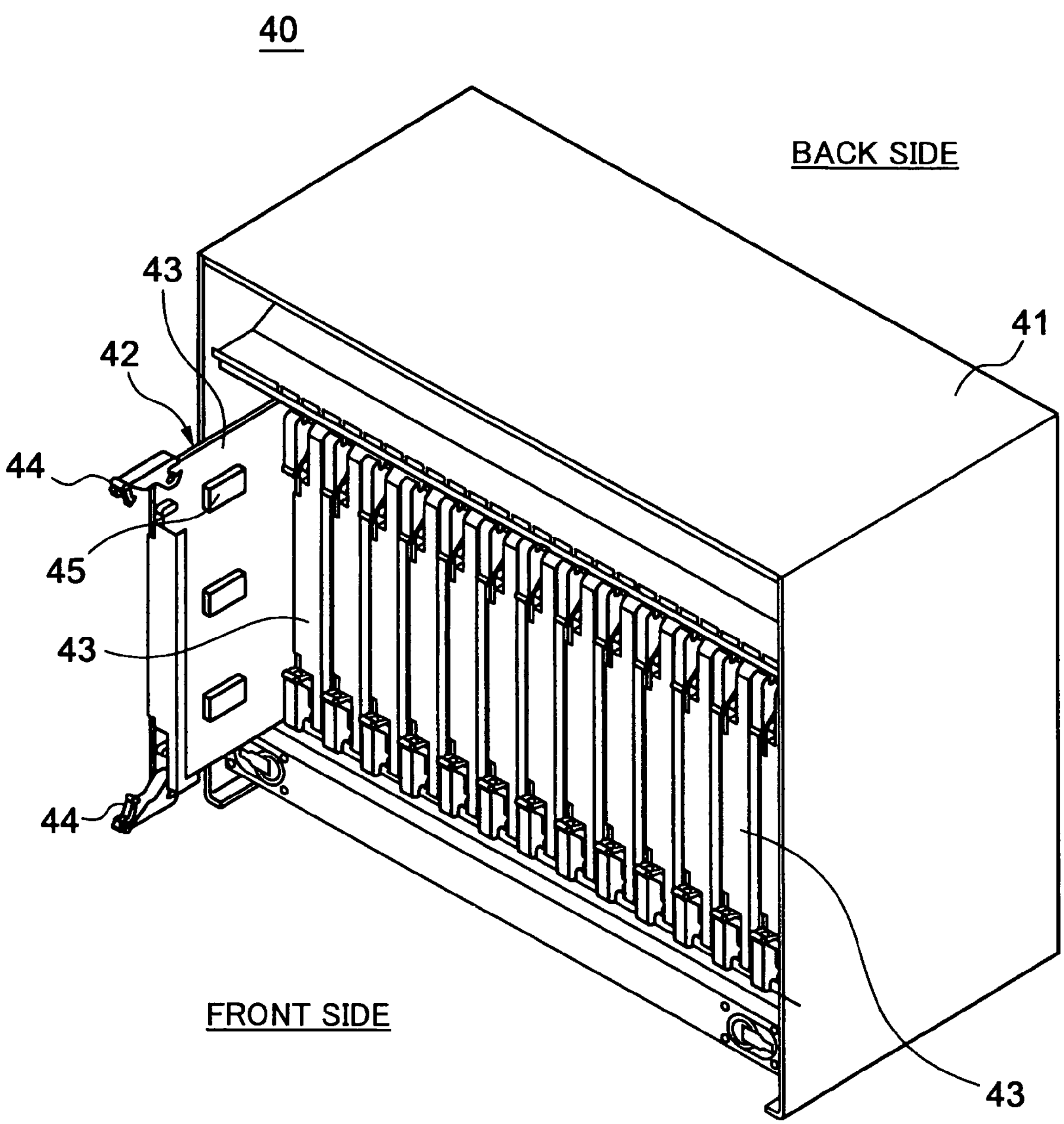
FIG. 4 is a perspective view of an electronic apparatus according to an embodiment of the present invention.

First, a description will be given, with reference to FIG. 4, of an electronic apparatus 40 according to an embodiment of the present invention. FIG. 4 is a perspective view of the electronic apparatus 40 according to the embodiment of the present invention.

The electronic apparatus 40 generally comprises a housing 41 and a plurality of plug-in units 42 accommodated and arranged in the hosing 41. It should be noted that, in FIG. 4, "front side" indicates a side of the electronic apparatus 40 where attachment levers 44 are located, and "apparatus back side" indicates a side of the electronic apparatus 40 opposite to the side where the attachment levers 44 are located. The attachment levers 44 are provided on the apparatus front side so that each plug-in unit 42 can be removably fixed to the housing 41 of the electronic apparatus 40. The plug-in units 42 are accommodated in the housing 41, and are attached to a back board provided to the housing 41.

Figure 5:
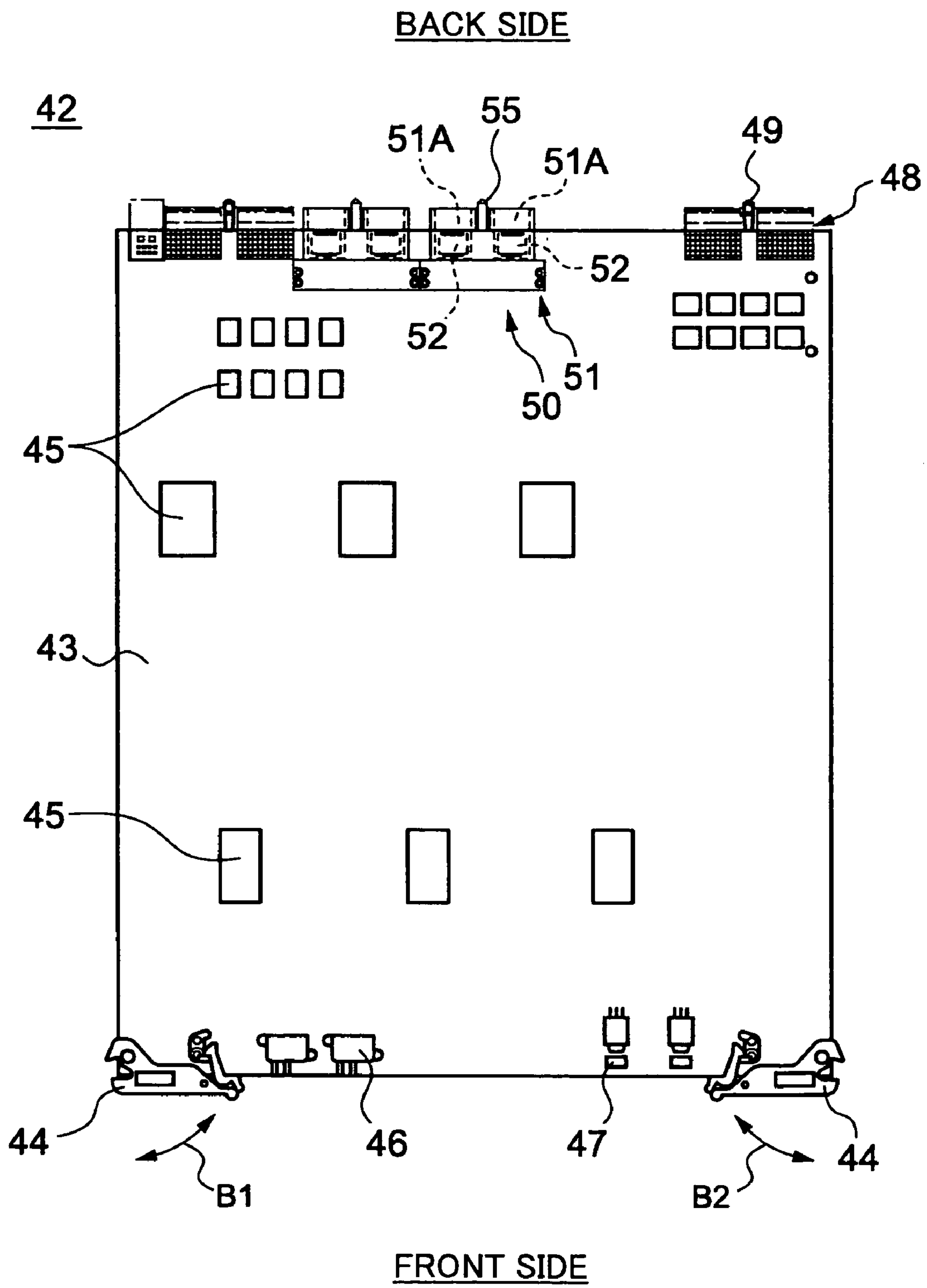
FIG. 5 is a plan view of a plug-in unit according to the present invention.
Figure 6:
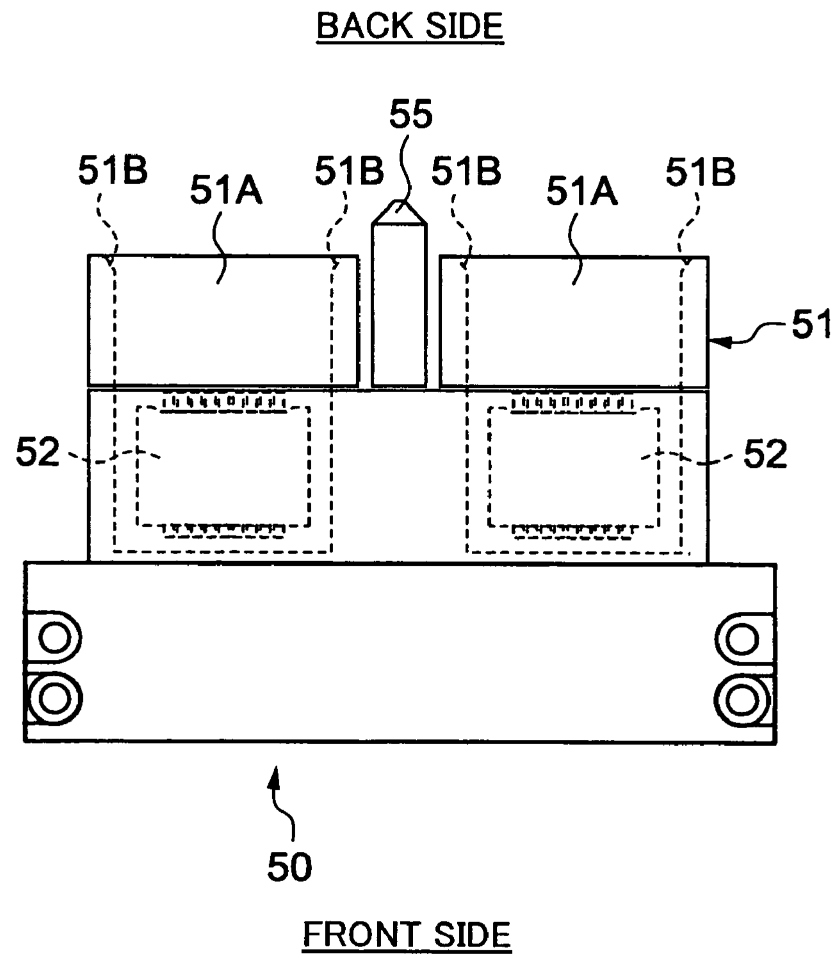
FIG. 6 is a plan view of a connector housing shown in FIG. 5.
Figure 7:
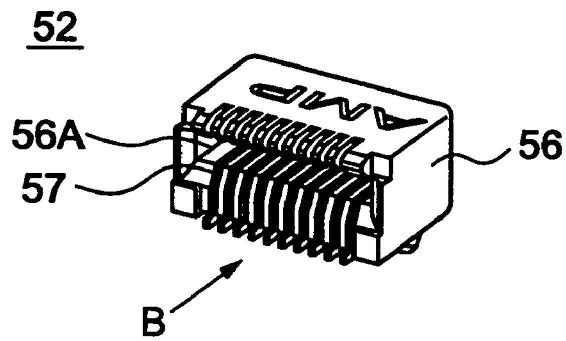
FIG. 7 is a perspective view of a connector provided in the plug-in unit shown in FIG. 5.
Figure 8:
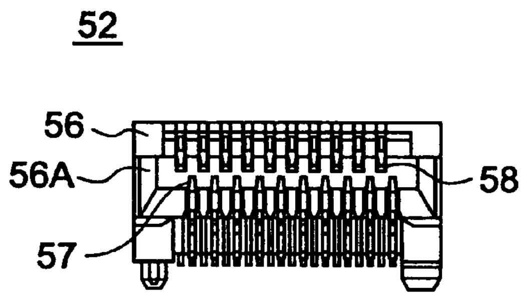
FIG. 8 is a front view of the connector shown in FIG. 7.

A description will now be given, with reference to FIG. 5 through FIG. 8, of the plug-in unit 42. FIG. 5 is a plan view of the plug-in unit 42 according to the present embodiment. FIG. 6 is a plan view of a connector housing 50 shown in FIG. 5. FIG. 7 is a perspective view of a connector provided in the plug-in unit 42 shown in FIG. 5. FIG. 8 is a front view (viewed in a direction B in FIG. 7) of the connector shown in FIG. 7. It should be noted that, in FIG. 5, "front side" indicates a side of the electronic apparatus 40 where the attachment levers 44 are located, and "back side" indicates a side of the electronic apparatus 40 opposite to the side where the attachment levers 44 are located. Additionally, arrows B1 and B2 in FIG. 5 indicate directions of movement of the attachment levers 44.

As shown in FIG. 5, each plug-in unit 42 comprises a printed wiring board 43, the attachment levers 44, electronic parts 45, LED parts 46, switch parts 47, a connector part 48 for electrical connection and connector housings 50. The electronic parts 45 are mounted on the printed wiring board 43, and wiring to be electrically connected to the electronic parts 45 is formed on the printed wiring board 43. The pair of attachment levers 44 are mounted on the front side of the printed wiring board 43 so that the plug-in unit 42 can be removably attached to the housing 41. Also provided on the front side of the printed wiring board 43 are the LED parts 46, the switch parts 47 and indication labels that indicate designation of the corresponding parts.

The attachment levers 44 are configured to be movable in the directions B1 and B2 shown in FIG. 5, respectively, so that the plug-in unit 42 is fixed to the housing 41 or pulled out of the housing 41. The connector part 48 for electrical connection and the connector housings 50 are mounted to the printed wiring board 43 on the back side of the electronic apparatus 40. The connector part 48 for electrical connection is configured and arranged to be connected to a plug 62 for electrical connection provided in the back board 60 mentioned later. The connector part 48 for electrical connection is provided with an engagement protrusion 49. The engagement protrusion 49 is engaged with an engagement groove 63 provided in the plug 62 for electrical connection mentioned later. The connector housings 50 are configured and arranged to be connected with optical modules 80 attached to optical module housings 65 mentioned later. Since the LED parts, the switch parts 47 and the indication labels must be located on the front side of the electronic apparatus 40 due to their functions, an area where the connector housings 50 can be mounted is limited on the front side but there is a large freedom on the back side of the electronic apparatus 40.

Thus, by providing the connector housings 50 of the printed wiring board 43 on the back side of the apparatus, a number of the connector housings 50, which can be mounted on the printed wiring board 43, can be increased so that a larger number of the optical modules 80 can be connected than a conventional one. Moreover, since the optical modules 80 are connected from the back side of the printed wiring board 43, the LED parts, the switch parts 47 and the indication labels that are provided on the front side of the apparatus are prevented from being covered by optical cables 92 extending from the optical modules 80, thereby improving the visibility of the LED parts, the switch parts 47 and the indication labels.

A description will now be given, with reference to FIG. 6, of the connector housing 50. FIG. 6 is a plan view of the connector housing 50. The connector housing 50 generally comprises a connector housing body 51, connectors 52 and the engagement protrusion 55. Two insertion sections 51A into which the optical modules 80 are inserted are formed on a side of the connector housing body 51 on which the optical modules to are to be connected. The connectors 52, which are first connectors electrically connected to the optical modules 80, are provided in the insertion sections 51A.

As shown in FIGS. 7 and 8, each connector 52 comprises a connector body 56 and pin terminals 57 and 58. An insertion section 56A is formed in the connector body 56. Ten pieces of the pin terminals 58 are arranged on an upper surface of the connector body 56 forming the insertion section 56A, and ten pieces of the pin terminals 57 are arranged on a lower surface of the connector body 56. A terminal part 81A provided to each optical module 80 is insertable into the insertion section 56A formed in the connector 52 so as to electrically connect the pin terminals 57 and the respective pin terminals 58 to each other.

The connector housing body 51 provides the engagement protrusion 55, which is brought into engagement with a module housing 65 mentioned later. Moreover, a chamfer part 51B is formed in the connector housing body 51 located in the area where the insertion section 51A is formed. Thus, by forming the chamfer part 51B in the connector housing body 51, the optical module 80 can be smoothly guided to the insertion section 51A when inserting the optical module 80 into the connector housing 50.

Figure 9:
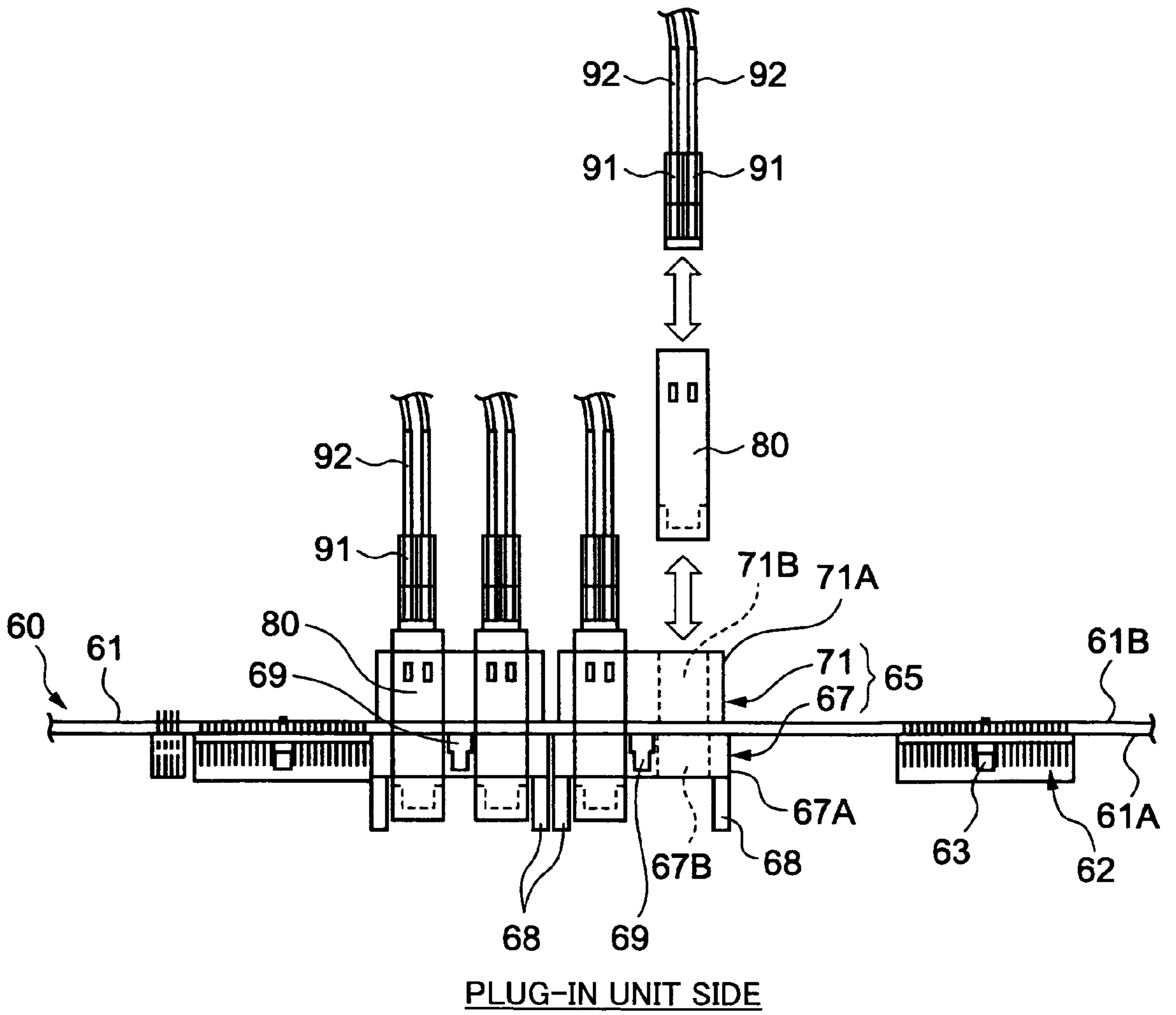
FIG. 9 is a plan view of a back board to which optical modules are connected.
Figure 10:
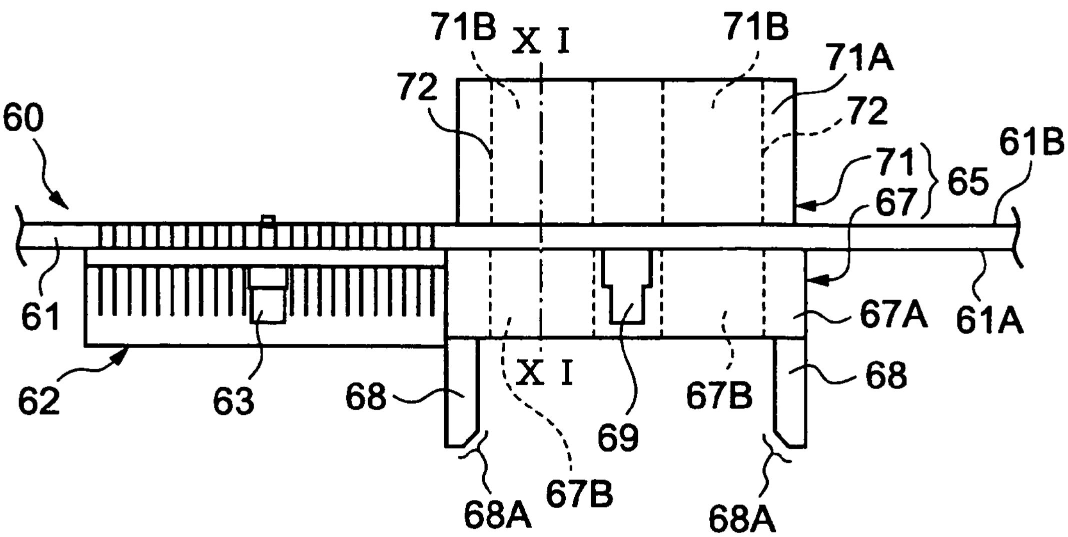
FIG. 10 is an enlarged view of an optical module housing provided to the back board.
Figure 11:
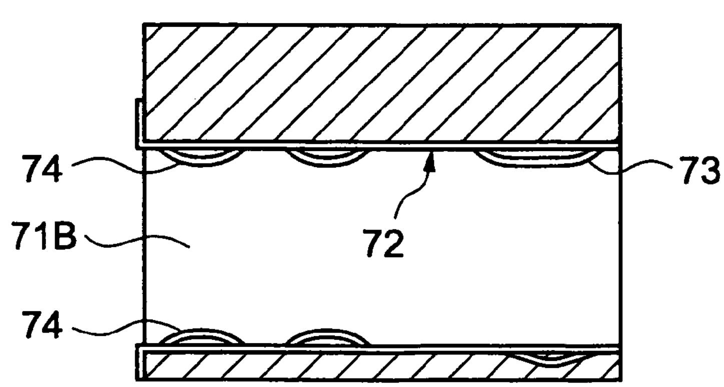
FIG. 11 is a cross-sectional view of a second housing shown in FIG. 10 taken along a line XI—XI of FIG. 10.
Figure 12:
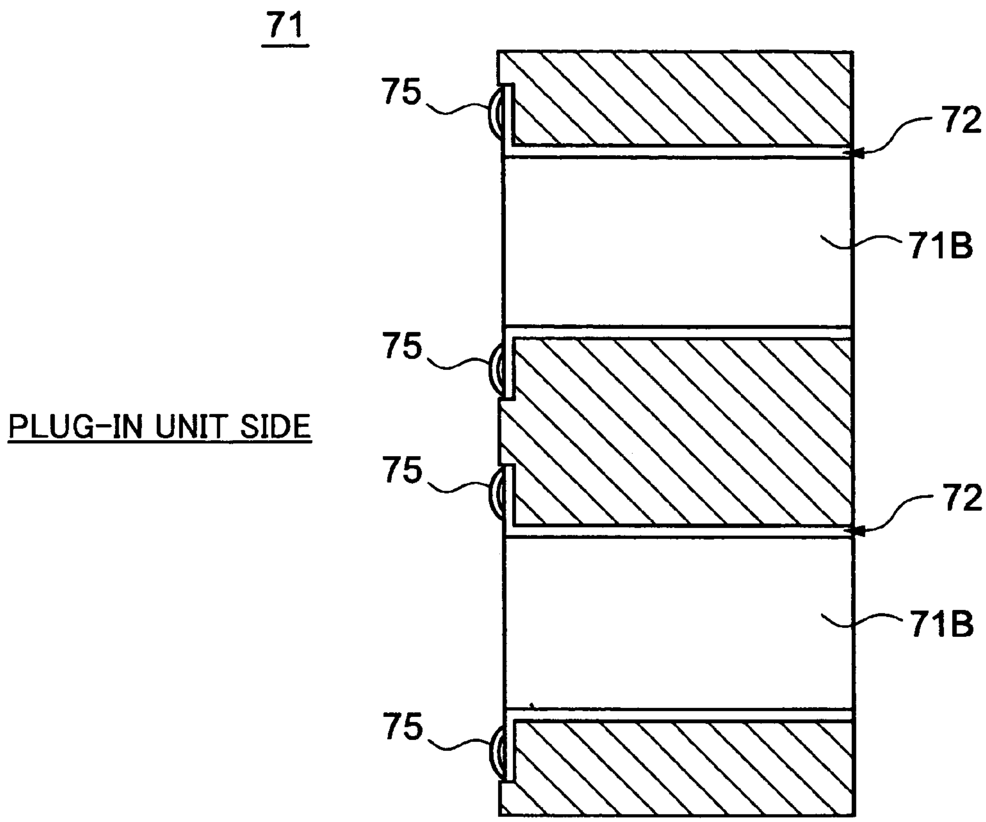
FIG. 12 is a cross-sectional view of the second housing shown in FIG. 10 taken along a line perpendicular to the line XI—XI of FIG. 10.

A description will now be given, with reference to FIGS. 9 through 12, of the back board 60 provided in the housing 41. FIG. 9 is a plan view of the back board 60 to which the optical modules 80 are connected. FIG. 10 is an enlarged view of the optical module housing provided to the back board 60. It should be noted that a fist surface 61A of the back board 61A faces a side where the plug-in units 41 are connected, and a second surface 62 is opposite to the first surface 61A. FIG. 11 is a cross-sectional view of a second housing shown in FIG. 10 taken along a line XI—XI of FIG. 10. FIG. 12 is a cross-sectional view of the second housing shown in FIG. 10 taken along a line perpendicular to the line XI—XI of FIG. 10.

As shown in FIG. 9, the back board 60 generally comprises a back board body 61, the plugs 62 for electrical connection and the optical module housings 65. The plugs 62 for electrical connection are configured and arranged to electrically connect the back board 60 to the plug-in units 42, and are connected to the respective connector parts 48 for electrical connection.

A description will now be given, with reference to FIG. 10, of the optical module housing 65. The optical module housing 65 is configured and arranged to mount the optical modules 80, and comprises a first housing 67 and a second housing 71.

The first housing 67 is arranged on the first surface 61A of the back board body 61. The first housing 67 comprises a first housing body 67A and mis-insertion preventing members 68.

The first housing body 67A is provided with two insertion sections 67B, which are first insertion sections into which the optical modules 80 are insertable. The engagement groove 69 is formed between the two insertion sections 67B in the first housing body 67A. The engagement groove 69 is configured and arranged to be engaged with the engagement protrusion 55 provided in the connector housing 50 so that the first housing 67 is attached to the connector housing 50. The pair of mis-insertion preventing members 68 are provided to the first housing body 67A on the plug-in unit side, and a chamfer part 68A is provided on an end of each of the mis-insertion preventing members 68.

Thus, by providing the pair of mis-insertion preventing members 68 to the first housing 67, the first housing 67 to which the optical modules 80 are attached is prevented from being erroneously connected to the connector part 48 for electrical connection, thereby preventing the optical modules 80 and the connector part 48 from being damaged. Moreover, by forming the chamfer parts on the ends of the pair of mis-insertion preventing members 68, even if there is a small misalignment existing between the connector housing and the first housing 67 when connecting the back board 60 to the plug-in units 42, the first housing 67 can be surely connected to the connector housing 50.

A description will now be given, with reference to FIGS. 10 through 12, of the second housing 71. The second housing 71 is arranged on the second surface 61B of the back board body 61. The second housing 71 comprises a second housing body 71A and metal plates 72. Two second insertion sections 71B for inserting the optical modules 80 are formed in the second housing body 71A, and the second insertion sections 71B are connected to the respective first insertion sections 67B.

The metal plates 72 are provided to a surface of the second housing 71 forming the second insertion section 71B and a surface of the second housing on the side of the plug-in units 42 so as to discharge a static electricity. As shown in FIG. 11, the metal plate 72, which is provided to the surface of the second housing forming the second insertion sections 71B, is provided with a plurality of spring portions 74 and an engagement part 73. The spring sections 74 are configured and arranged to support the optical module 80, and are made of a metal of the same as the metal plate 72.

A groove is formed in the engagement part 73 so as to be engaged with an engagement protrusion 82 mentioned later. Moreover, the metal plate 72 is electrically connected to the back board 60 through a spring part 75.

Thus, by providing the metal plate 72 for discharging static electricity to the second housing 71, static electricity generated in the optical module 80 can be discharged, thereby preventing the plug-in unit 42 from being damaged. Moreover, by providing the engagement part 73 to the metal plate 72, the engagement protrusion 82 provided to the optical module 80 is engaged with the engagement part 73, which attaches the optical module 80 in the optical module housing 65.

As shown in FIG. 12, the metal plate 72 arranged on the surface of the second housing 71 on the side of the plug-in units 42 is provided with the spring part 75 that serves as an elastic part. The spring part 75 is formed of a metal the same as the metal plate 72.

Thus, by providing the spring part 75 formed of a metal to the second housing 71 on the plug-in unit side, the second housing 71 can be electrically connected to the plug-in unit 42, and the second housing 71 can be slightly displaced with respect to the first housing 67, which allows the optical module 80 being inserted smoothly into the optical module housing 65.

Figure 13:
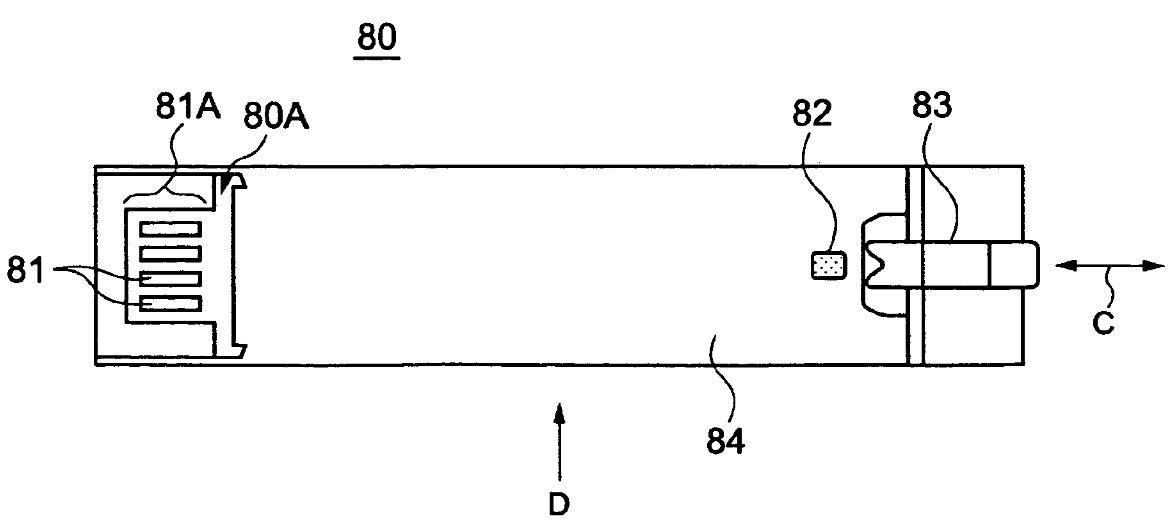
FIG. 13 is a plan view of an optical module.
Figure 14:
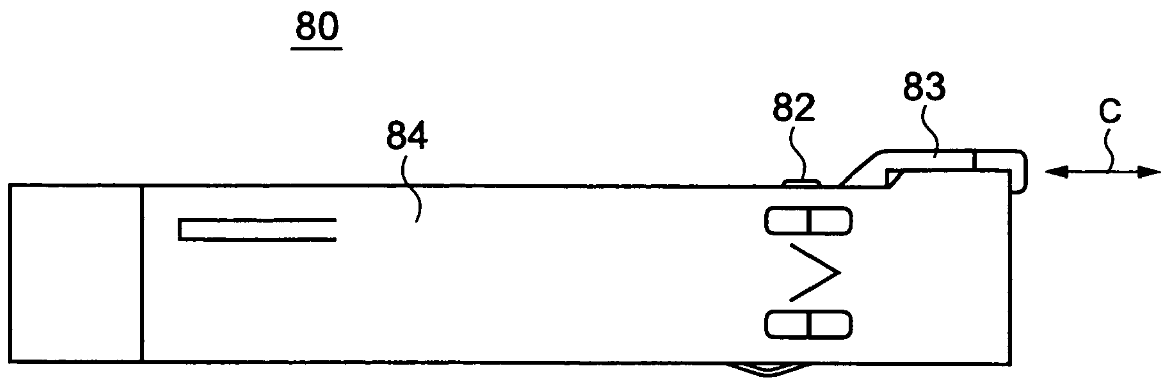
FIG. 14 is a view of the optical module viewed in a direction indicated by an arrow D of FIG. 13.

A description will now be given, with reference to FIGS. 13 and 14, of the optical module 80. The optical module 80 has a photoelectric-translation function. FIG. 13 is a plan view of the optical module 80. FIG. 14 is a view of the optical module 80 shown in FIG. 13 viewed in a direction indicated by an arrow D. It should be noted that arrows C in FIGS. 13 and 14 indicate directions (directions C) in which a slid-type lever 83 is slidable.

The optical module 80 generally comprises an optical module body 80A, a terminal part 81A, a plurality of terminals 81, the engagement protrusion 82, the slide-type lever 83 and a case part 84. The of optical module body 80A is arranged in the case part 84. The terminal part 81A is provided on one end of the optical module body 80A, and the terminals 81 are arranged in the terminal part 81A. The terminal part 81A is inserted in the insertion section 56A of the connector 52, and the optical module 80 is electrically connected to the plug-in unit 42 by the terminals 81 being brought into contact with the respective pin terminals 57 and 58.

Figure 15:
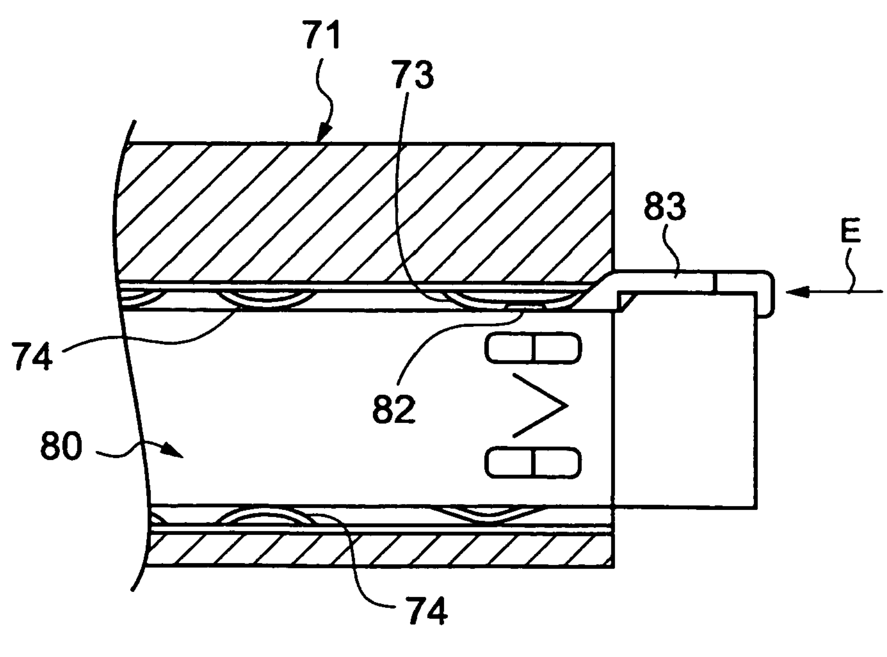
FIG. 15 is a part of the optical module in a state where the optical module is attached to the optical module housing.

The engagement protrusion 82 and the slide-type lever 83 are provided to the case part 84 on the side where the terminal part 81 is not formed. The slide-type lever 83 is configured and arranged to be slidable in the directions C. FIG. 15 is a view of the optical module 80 attached to the second housing 71. It should be noted that, in FIG. 15, the second housing 71 is shown as a cross-sectional view. As shown in FIG. 15, the engagement protrusion 82 is engaged with the engagement part 73 provided to the second housing 71.

The slide-type lever 83 is configured and arranged to remove the optical module 80 attached to the second housing 71. In the state shown in FIG. 15, by causing the slide-type lever 83 to slide in the direction indicated by an arrow E so as to move the engagement part 73 upwardly in FIG. 15, the engagement protrusion 82 moves out of the groove of the engagement part 73, which permits the optical module 80 being pulled out of the second housing 71.

Figure 16:
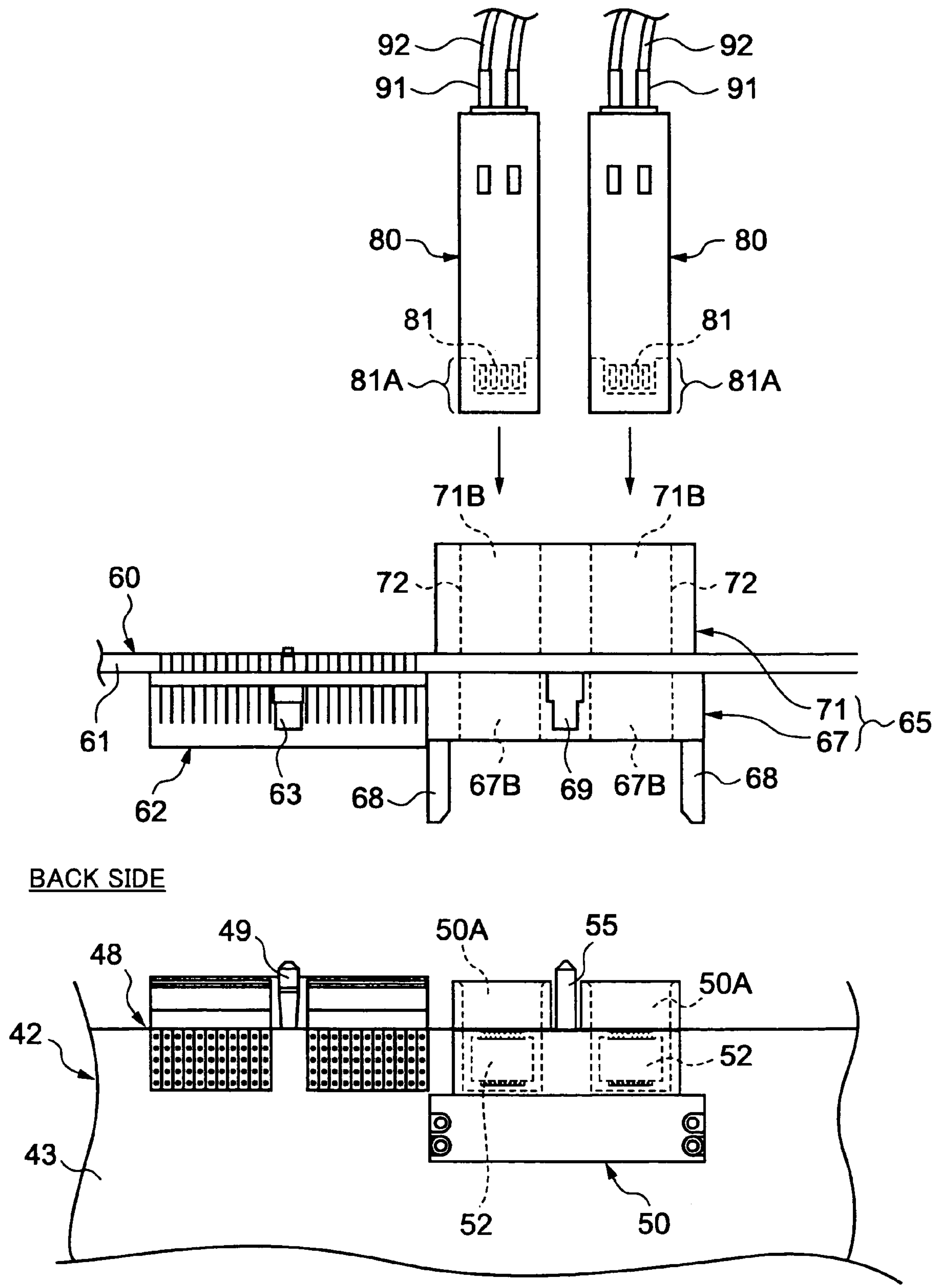
FIG. 16 is a plan view of the plug-in unit, the back board and the optical modules before being connected.
Figure 17:
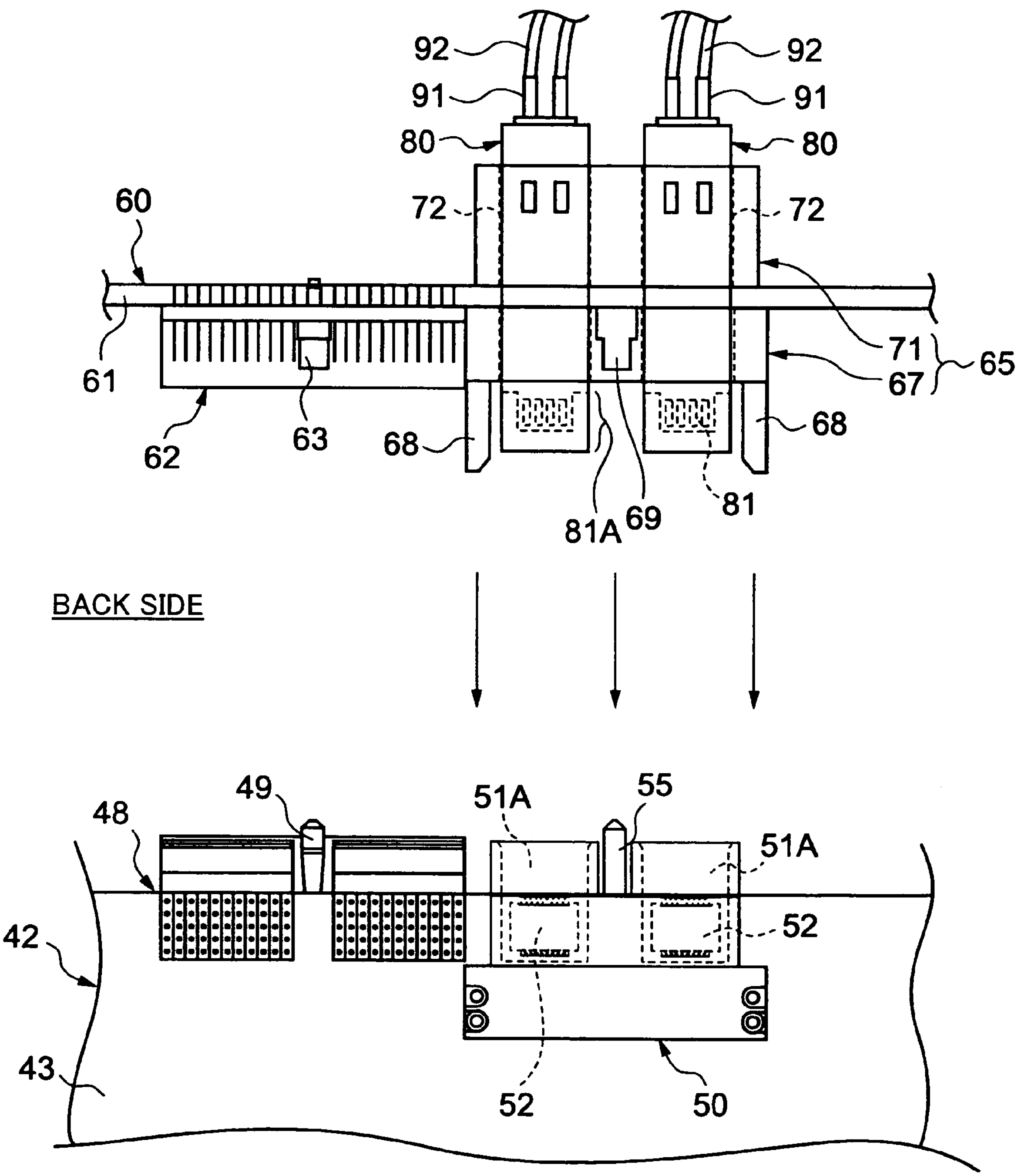
FIG. 17 is a plan view of the plug-in unit, the back board and the optical modules in a state where the optical modules are connected to the back board.
Figure 18:
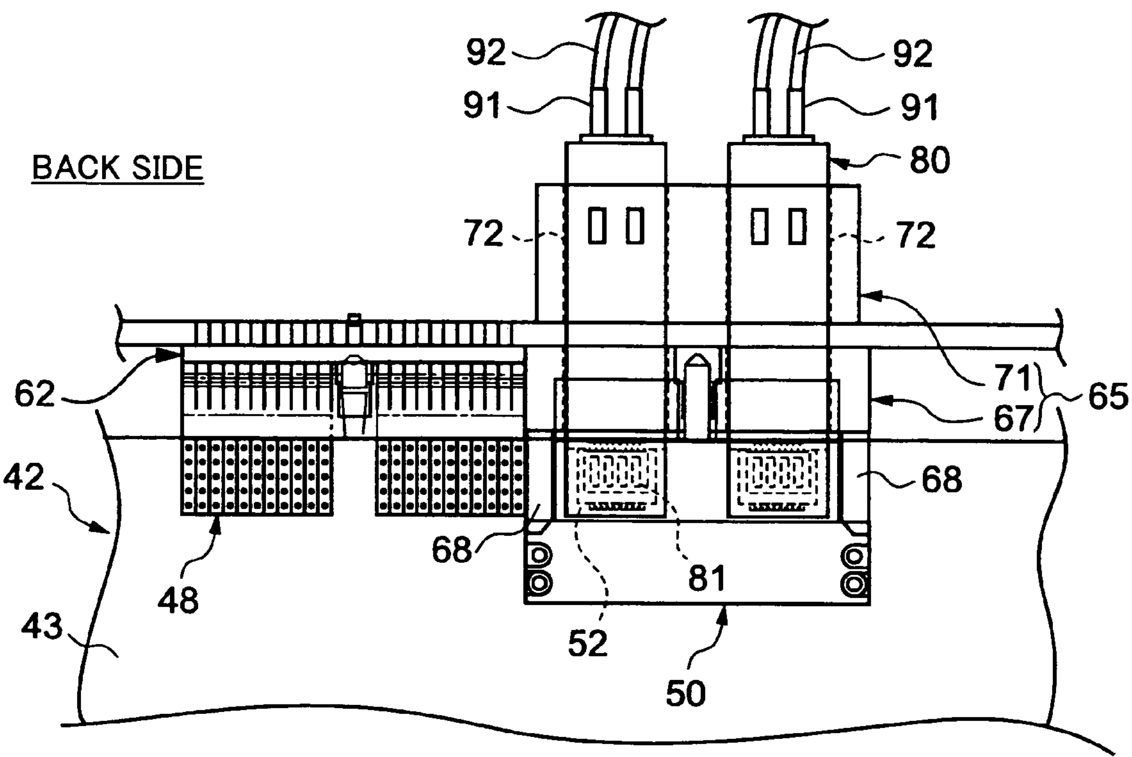
FIG. 18 is a plan view of the plug-in unit, the back board and the optical modules in a state where the optical modules are connected to the back board and also the plug-in unit is connected to the back board.

A description will now be given, with reference to FIG. 16 through FIG. 18, a method of connecting the above-mentioned plug-in unit 42, the back board 60 and the optical module 80. FIG. 16 is a plan view of the plug-in unit, the back board and the optical modules before being connected. FIG. 17 is a plan view of the plug-in unit, the back board and the optical modules in a state where the optical modules are connected to the back board. FIG. 18 is a plan view of the plug-in unit, the back board and the optical modules in a state where the optical modules are connected to the back board and also the plug-in unit is connected to the back board. In FIG. 16 through FIG. 18, parts that are the same as the parts shown in FIGS. 5, 6, 9, 10 and 13 are given the same reference numerals, and descriptions thereof will be omitted.

In the state shown in FIG. 16, the optical modules 80 to which the plugs 91 and the optical cables 92 are connected are inserted into the corresponding first and second insertion sections 67A and 71A, which are formed in the optical module housing 65. As shown in FIG. 17, when the optical modules 80 are attached to the optical module housing 65, terminal parts 81A of the optical modules 80 protrude from the optical module housing 65. It should be noted that an amount of protrusion of the terminal parts 81 are previously set so as to be smaller than an amount of protrusion of the mis-insertion preventing members 68. Accordingly, when connecting the plug-in unit 42 to the back board 60, the mis-insertion preventing members 68 can be brought into contact with the plug-in unit 42 prior to the optical modules 80, thereby preventing the plug-in unit 42 and the back board 60 from being damaged due to mis-insertion.

The state shown in FIG. 18 is made by connecting the plug-in unit 42 to the back board 60 to which the optical modules 80 are connected. When removing the plug-in unit 42 from the back board 60 in the state where the optical modules 80, the back board 60 and the plug-in unit 42 are connected, there is no need to drag the optical cables away from the optical modules 80 in the present embodiment as shown in FIG. 17. Thus, the plug-in unit 42 can be easily attached to and detached from the back board 60, which improves maintenanceability.

Figure 19:
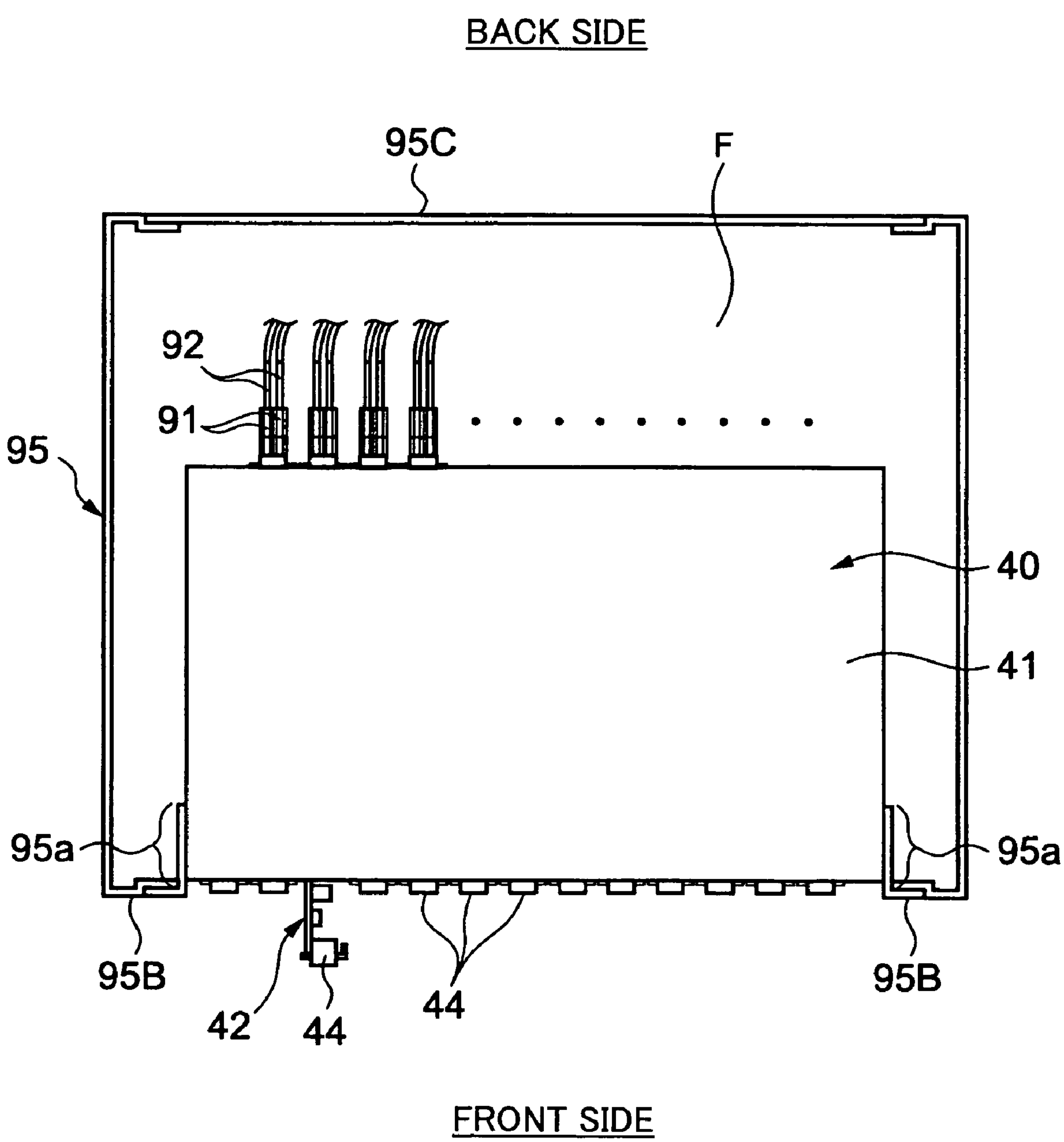
FIG. 19 is a plan view of the electronic apparatus, which is accommodated in a locker.

FIG. 19 is a plan view the electronic apparatus according to the present embodiment, which is accommodated in a locker. As shown in FIG. 19, in the electronic apparatus 40, the optical cables 92 connected to the optical modules 80 extend on the back side of the apparatus, and the optical cables 92 are accommodated in an area F between a rear wall 95C of the locker 95 and a rear wall of the electronic apparatus 40. Therefore, it is not necessary to provide the area for accommodating the optical cables 92 on the front side of the apparatus as in the conventional one. Therefore, when accommodating the electronic apparatus 40 in the locker 95, which can accommodate a plurality of electronic apparatuses, the front face of the electronic apparatus 40 can be substantially aligned with a front face 95B of the locker 95. Thus, there is no need to provide the reinforcing members to the support parts 95*a*, which support the electronic apparatus as in the conventional one, thereby reducing a number of parts of the locker 95.

The present invention is not limited to the specifically disclosed embodiments, and variations and modifications may be made without departing from the scope of the present invention.

The present application is based on Japanese priority application No. 2003-348482 file Oct. 7, 2003, the entire contents of which are hereby incorporated by reference.

What is claimed is:

1. A plug-in unit comprising:

a first connector connectable to an optical module connected to an optical cable;

a connector housing accommodating said first connector and having an insertion part into which the optical module is inserted; and an attachment lever that is used for fixing the plug-in unit to a housing in which the plug-in unit is accommodated, wherein said first connector is located on a first side of the plug-in unit opposite to a second side where said attachment lever is located, and said connector housing is configured to be connected to an optical module housing which is separate from said optical module so that said optical module is inserted into the insertion part through the optical module housing.

2. A plug-in unit as claimed in claim 1, wherein an open end of said insertion part has a chamfer part that guides the optical module moving into said insertion part.

3. An electronic apparatus comprising:

a housing including:

a back board to which a plug-in unit is attached; and an optical module housing separate from an optical module and mounted on said back board, the optical module housing detachably attaching the optical module; and the plug-in unit that is accommodated in said housing, the plug-in unit including:

a first connector connectable to an optical module connected to an optical cable;

a connector housing accommodating said first connector and having an insertion part into which the optical module is inserted; and an attachment lever that is used for fixing the plug-in unit to said housing, wherein said first connector is located on a first side of the plug-in unit opposite to a second side where said attachment lever is located, and said connector housing is configured to be connected to said optical module housing so that said optical module is inserted into the insertion part through the optical module housing.

4. The electronic apparatus as claimed in claim 3, wherein the optical module has an engagement protrusion, and said optical module housing has an engagement groove that is engaged with the engagement protrusion when the optical module is attached to the optical module housing.

5. An electronic apparatus comprising:

a housing including:

a back board to which the plug-in unit is attached; and an optical module housing mounted on said back board, the optical module detachably attaching the optical module; and a plug-in unit that is accommodated in said housing, the plug-in unit including:

a first connector connectable to an optical module connected to an optical cable;

a connector housing accommodating said first connector and having an insertion part into which the optical module is inserted; and an attachment lever that is used for fixing the plug-in unit to said housing, wherein said first connector is located on a first side of the plug-in unit opposite to a second side where said attachment lever is located, and wherein said optical module housing includes:

a first housing provided on a first surface of said back board, the first housing forming a first insertion part that is a part of said insertion part; and a second housing provided on a second surface of said back board opposite to said first surface and forming a second insertion part that is a part of said insertion part, a metal plate being provided in said second insertion part so as to discharge static electricity, wherein said first insertion part and said second insertion part are configured and arranged to receive said optical module.

6. The electronic apparatus as claimed in claim 5, wherein said metal plate has a first elastically deformable part configured and arranged to be connected to the second surface of said back board.

7. The electronic apparatus as claimed in claim 6, wherein said metal plate has a second elastically deformable part configured and arranged to support the optical module.

8. The electronic apparatus as claimed in claim 5, wherein said first housing has a pair of mis-insertion preventing members each of which has an end having a chamfer part.

* * * * *